April 12, 1966 W. ZIEROLD 3,245,182
MOTOR VEHICLE WINDOW
Filed May 21, 1964

WALTER ZIEROLD
INVENTOR

BY *John R. Faulkner*
*John J. Loethel*
ATTORNEYS

3,245,182
MOTOR VEHICLE WINDOW
Walter Zierold, Upminster, Essex, England, assignor to Ford Motor Company, Dearborn, Mich., a corporation of Delaware
Filed May 21, 1964, Ser. No. 369,144
Claims priority, application Great Britain, May 23, 1963, 20,558/63
6 Claims. (Cl. 52—208)

This invention relates to motor vehicle windows, and to resilient clips used in such windows.

The glass of a motor vehicle windshield or rear window is usually secured to the window frame by means of a rubber weatherstrip which also holds a decorative moulding in position around the edge of the window. Recently, however, the glass in some windows has been bonded to the window frame, and this has given rise to two problems: firstly, locating the glass while the adhesive is setting; and secondly, fixing the decorative moulding around the edge of the glass.

In a motor vehicle window according to this invention the glass is bonded to the window, and resilient clips locate the glass in its own plane during setting of the adhesive and also hold a decorative moulding in position around the edge of the window.

Preferably the glass is bonded to a flange; the arms of a U-shaped part of a one-piece resilient clip resiliently engage opposed surfaces of the flange; the outer arm of the U-shaped part has an extension which forms a platform part, a projection, and a retainer prong; the platform part engages the edge of the glass, and the projection engages a shoulder inclined at a large angle to the flange to locate the platform part a fixed distance from the shoulder; and a decorative moulding is clamped in position between the platform part and the retainer prong around the outer edge of the glass.

Advantageously, the outer arm has a projection which limits movement of the glass toward the flange.

Preferably, the inner arm of the U-shaped part has an extension which forms a platform part and a retainer prong, and a decorative moulding is clamped in position between the platform part and prong around the inner edge of the glass.

Figure 1:
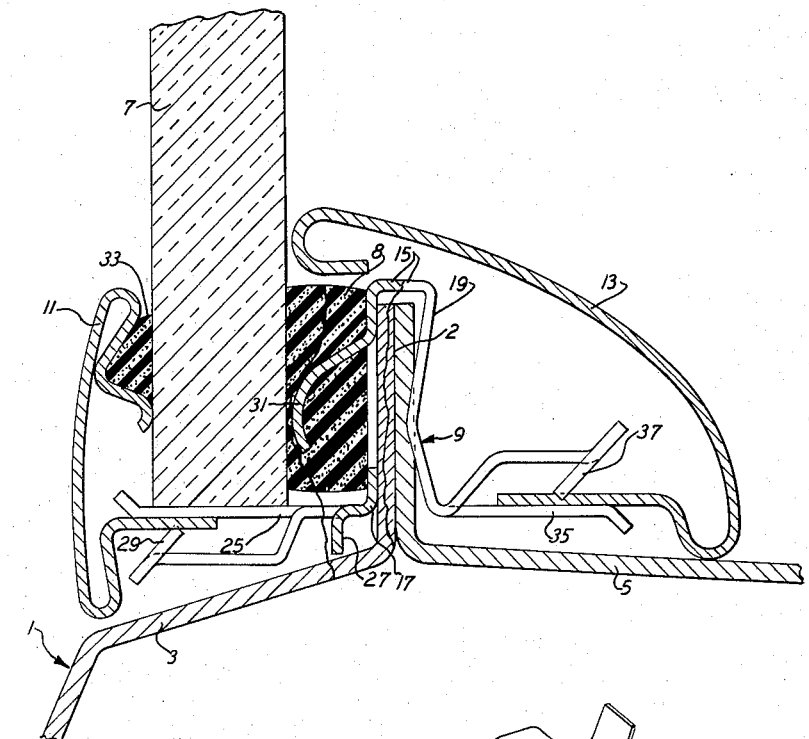
Figure 2:
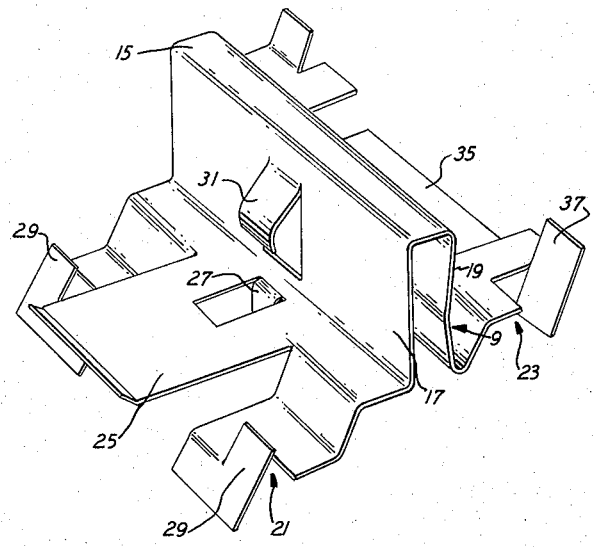

The invention is hereinafter particularly described with reference to the accompanying drawings in which:

FIG. 1 is a section through part of a window; and
FIG. 2 is a perspective view of the resilient clip embodied in the present invention.

The window comprises a frame 1 having a flange 2, an outer shoulder 3 inclined at a large angle to the flange 2 and an inner shoulder 5 also inclined at a large angle to the flange 2, a glass 7 bonded by a polysulphide rubber adhesive 8 to the flange 2, a plurality of one-piece resilient clips 9 (see FIG. 2), an outer decorative moulding 11, and an inner decorative moulding 13.

The clips 9 (only one of which is shown) have two functions: firstly, they locate the glass 7 during the bonding; and secondly, they hold the outer and inner decorative mouldings in position. Each clip has a U-shaped part 15 whose outer and inner arms 17 and 19 resiliently engage opposed surfaces of the flange, the outer arm 17 having an extension 21 and the inner arm 19 having an extension 23.

The extension 21 has a central platform part 25, a depending projection 27 formed by punching a piece out of the platform part 25, and an upwardly extending retainer prong 29 on each side of the platform part 25. The outer arm 17 has a projection 31.

The projection 27 locates the platform part 25 a certain distance from the shoulder 3. During fitting of the glass, the platform part 25 locates the glass in its own plane, while the projection 31 limits movement of the glass toward the flange 2.

The decorative moulding 11, which is made of resilient metal, is clamped between the platform part 25 and the retainer prongs 29 and resiliently engages the glass 7. It can be fitted after the glass has been bonded in position. In order to prevent leakage of water into the moulding, the upper part of the moulding may be bonded as shown at 33 to the glass.

The extension 23 has a central platform part 35 and a retainer prong 37 on each side of the platform part 35. The inner decorative moulding 13 is clamped between the prong 37 and platform part 35 and resiliently engages the inner shoulder 5.

The clips 9 are uniformly fitted along the flange 2.

It will be understood that the invention is not to be limited to the exact construction shown and described, but that various changes and modifications may be made without departing from the spirit and scope of the invention, as defined in the appended claims.

I claim:
1. In a window assembly;
   a window frame comprising a shoulder and a flange extending into the window opening defined thereby;
   a window glass;
   adhesive means bonding said window glass to said flange;
   resilient clip means comprising a U-shaped part having inner and outer arms resiliently engaged with opposite sides of said flange,
   an extension on said outer arm having a platform part, a projection and a retainer prong,
   said platform part being engaged by and supporting an edge of said glass,
   said projection being in engagement with said frame shoulder and locating said platform part a fixed distance from said shoulder;
   and a decorative moulding having a part thereof clamped between said platform part and said retainer prong,
   said decorative moulding concealing the outer marginal portion of said glass.
2. In a window assembly according to claim 1 in which the outer arm of the U-shaped part of said resilient clip means has a projection contiguous to the inner surface of said glass to limit movement thereof toward said flange.
3. In a window assembly according to claim 2 in which the inner arm of the U-shaped part of said resilient clip means has an extension extending in a direction opposite to the extension on said outer arm,
   said inner arm extension having a platform part and a retainer prong;
   and a decorative moulding having a part thereof clamped between said last mentioned platform part and said retainer prong,
   said last mentioned decorative moulding concealing the inner marginal portion of said glass.
4. In a window assembly according to claim 1 in which the inner arm of the U-shaped part of said resilient clip means has an extension extending in a direction opposite to the extension on said outer arm,
   said inner arm extension having a platform part and a retainer prong;
   and a decorative moulding having a part thereof clamped between said last mentioned platform part and said retainer prong,
   said last mentioned decorative moulding concealing the inner marginal portion of said glass.
5. Resilient clip means for positioning a panel and decorative moulding strip means relative to a shoulder and pinchweld flange of a window frame;

said clip means comprising a U-shaped part having inner and outer arms resiliently engageable with opposite sides of said pinchweld flange,
an extension on said outer arm having a platform part, a projection and a retainer prong,
said platform part being adapted to receive an edge of said transparent panel to provide support in the plane of the latter,
said projection being engageable with said shoulder to locate said platform part a fixed distance therefrom,
said retainer prong being engageable with a part of a decorative moulding strip to clamp the latter against said platform part to conceal the outer marginal part of said transparent panel,
and an extension on said inner arm extending in a direction opposite to the extension on said outer arm,
said inner arm extension having a platform part and a retainer prong;
said last mentioned retainer prong being engageable with a part of another decorative moulding strip to clamp the latter against said inner arm platform.

6. Resilient clip means according to claim 5 in which the outer arm of the said U-shaped part has a projection adapted to abut the inner surface of the panel to limit movement thereof towards said flange.

References Cited by the Examiner

UNITED STATES PATENTS

| | | | |
|---|---|---|---|
| 2,456,553 | 12/1948 | Churchill | 24—81 |
| 2,794,218 | 6/1957 | Ramsay. | |

FOREIGN PATENTS

| | | |
|---|---|---|
| 655,268 | 7/1951 | Great Britain. |
| 848,848 | 9/1960 | Great Britain. |

HARRISON R. MOSELEY, *Primary Examiner.*

W. E. HEATON, *Assistant Examiner.*